A. A. KLIGMAN.
MOTOR CYCLE STAND.
APPLICATION FILED MAR. 4, 1914.

1,183,209.

Patented May 16, 1916.
2 SHEETS—SHEET 1.

Witnesses
W. C. Mulligan
W. E. Falk Jr.

Inventor
Abraham A. Kligman
By Richard Buver
his Attorney

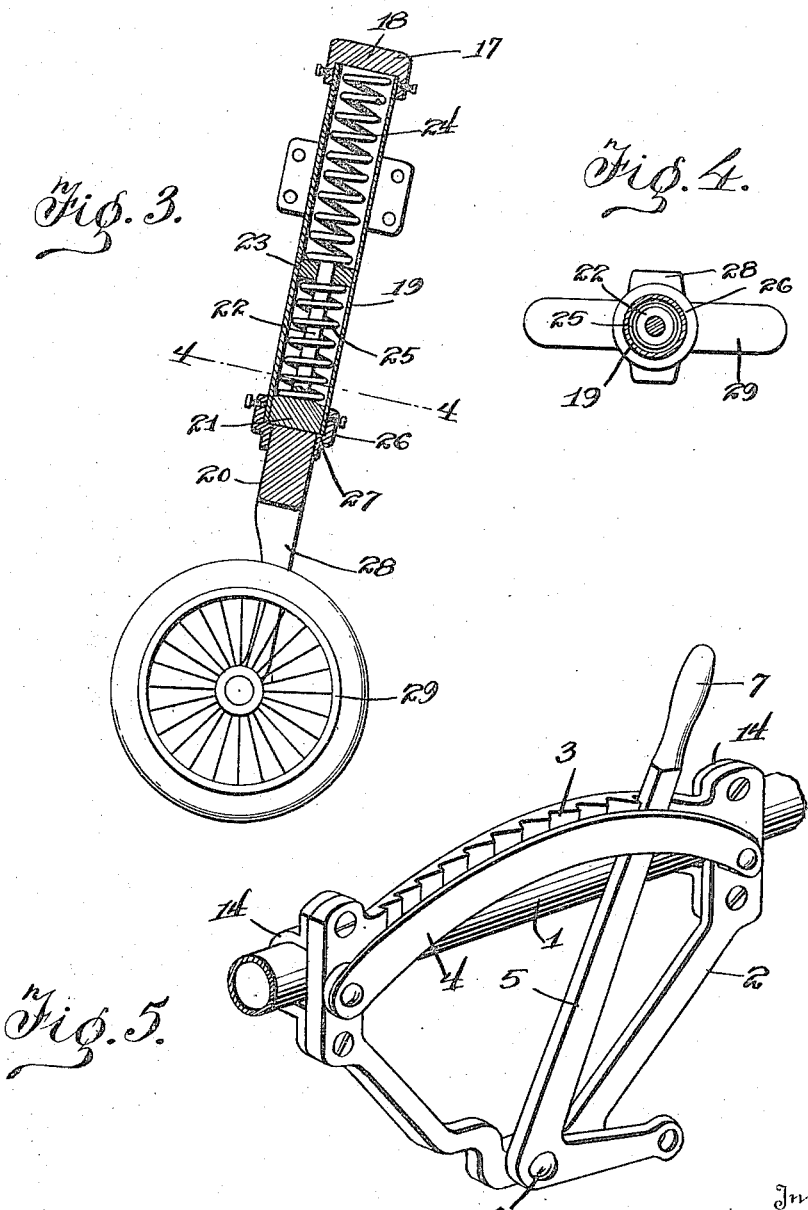

UNITED STATES PATENT OFFICE.

ABRAHAM A. KLIGMAN, OF NEWTONVILLE, MASSACHUSETTS.

MOTOR-CYCLE STAND.

1,183,209.  Specification of Letters Patent.  Patented May 16, 1916.

Application filed March 4, 1914. Serial No. 822,374.

*To all whom it may concern:*

Be it known that I, ABRAHAM A. KLIGMAN, citizen of the United States, residing at Newtonville, in the county of Middlesex and State of Massachusetts, have invented certain new and useful Improvements in Motor-Cycle Stands, of which the following is a specification.

This invention relates to an attachment for two wheeled vehicles, being particularly adapted for use as a stand or stabilizer for motor cycles.

An object of the invention resides in the provision of means in the nature of auxiliary wheels, disposed one upon each side of the machine, and so arranged with respect to an operating lever as to be raised and lowered through actuation thereof; the latter being situated conveniently for operation adjacent the steering device or mechanism of the machine.

The invention further contemplates a stand of such novel and peculiar construction as to effect, when lowered into engagement with the ground, not only a stabilizing device, but also an auxiliary support, the wheels of which are rotatable so as to in no way impede or resist either forward or backward movement of the machine.

The invention, as a further object, aims to provide a vehicle attachment of simple construction and of such a nature as to be readily applicable to motor cycles or other vehicles of a standard or well known type.

The above and additional objects are accomplished by such means as are illustrated in their preferred embodiment in the accompanying drawings, described in the following specification and then more particularly pointed out in the claim which is appended hereto and forms a part of this application.

In describing my invention in detail reference will be had to the accompanying drawings wherein like characters denote like or corresponding parts throughout the several views, and in which:—

Figure 1:
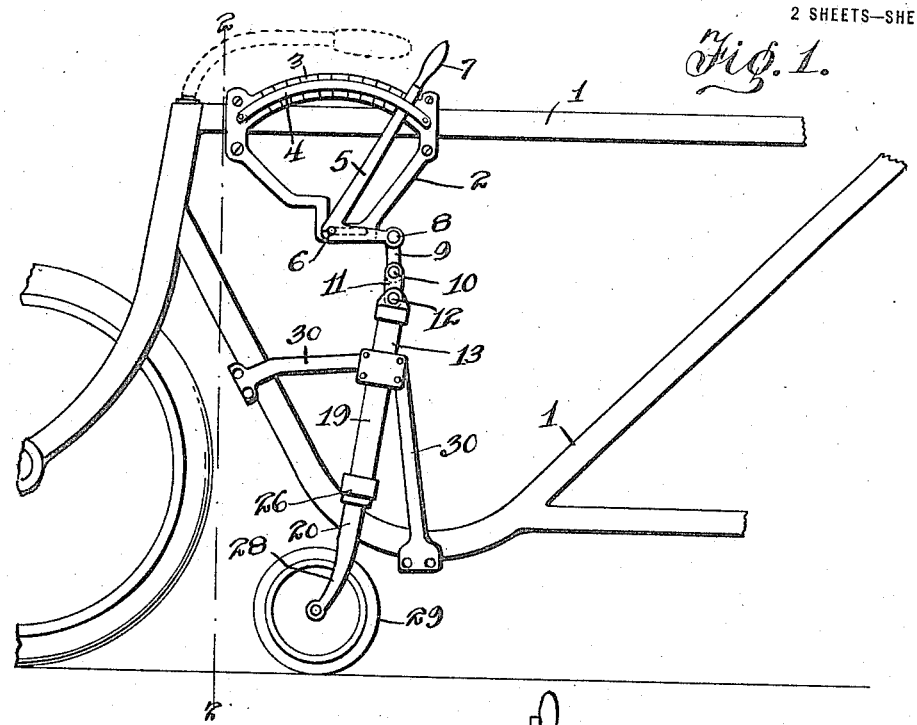
Figure 2:
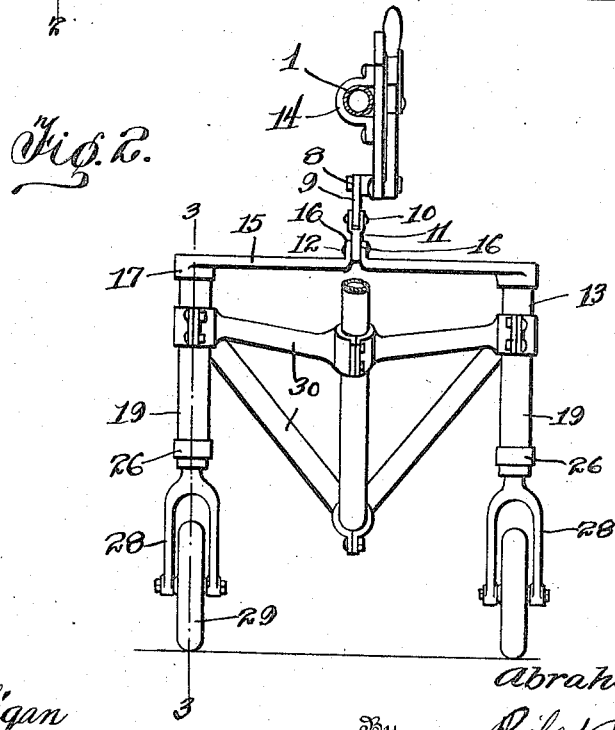

Figure 1 is a side elevation of a portion of a motor cycle frame illustrating the application of the invention thereto; Fig. 2 is a section on the line 2—2 of Fig. 1; Fig. 3 is an enlarged section on the line 3—3 of Fig. 2; Fig. 4 is a section on the line 4—4 of Fig. 3; and Fig. 5 is a detail perspective view of the operating lever and the means provided for locking the same in its various adjusted positions.

Referring now to the drawings by numerals, 1 designates as an entirety a stripped motor cycle frame to the forward portion of which is arranged the stand or stabilizer comprising the present invention. The said stand or stabilizer in its preferred embodiment comprises a quadrant 2 provided with lateral teeth 3 and a flat spring member 4, the latter being arcuate in form and disposed to extend from one to the other end of that portion of the quadrant having the teeth 3 formed thereon, the said spring serving as a retaining element whereby the operating lever designated 5 is at all times maintained in engagement with the said teeth. The lever 5 is of the bell crank type being pivoted as at 6 to the quadrant 2, one end of the lever having a handle 7 formed thereon, the opposite end being pivoted as at 8 to a link 9 in turn pivoted as at 10 to a second link 11, the latter being pivoted as at 12 to the duplicate sections of which the stabilizing device or stand, designated as an entirety by the numeral 13 is composed. Brackets 14 are secured to the quadrant 2 and disposed to embrace that portion of the frame 1 extending in a horizontal plane adjacent the handle bars of the machine.

The sections of which the stand or stabilizing device 13 composed, being the same, but one of the said sections will be described in detail. As above noted, the stand 13 is pivoted as at 12 to the link 11. It is from this pivot point 12 that the two sections extend, one of the said sections comprising what might be termed an arm 15, one end of which is provided with a right angled extension 16 pivoted as above set forth as at 12, the opposite end being enlarged as at 17 and provided with a recess 18 within which is seated the one end of a cylindrical or tubular member 19. Operating within the cylindrical member 19 is a support member 20 enlarged intermediate its ends as at 21 and provided with an extension 22 at all times inclosed within the said cylinder. Loose upon the extension or stem 22 is a collar 23, the periphery of which is adapted for frictional engagement with the inner wall of the cylinder to serve as a centralizing element for the said stem to in this manner maintain the support 20 in perfect axial alinement with the vertical axis of the member 19.

As a means whereby the collar 23 is maintained in the desired position relative to the stem 22, I provide a spring 24, one end of which abuts the enlargement 17 of the arm 15 and the opposite end the said collar, the expansive pressure of the spring providing a yieldable support for the said collar against movement in one direction. Movement of the collar in the opposite direction is yieldably resisted by means of a second spring 25, one end of the latter spring abutting the enlargement 21 of the support 20 and the opposite end the opposite face of the collar from that engaged by the spring 24 aforesaid. Both springs 24 and 25 serve as a yieldable support or cushion for the entire support member 20, the latter being maintained in proper place with respect to the cylinder 19 through the medium of a specially devised collar 26 arranged to embrace the lower end of the cylinder and the support 20, and, as a shoulder 27 is formed upon the latter by the provision of the enlargement 21, it is apparent that downward movement of the said support is limited by the engagement of the shoulder 27 with the collar 26. The above structure is clearly shown in Fig. 3 of the drawings. A forked extension 28 is formed upon the support 20, between the force of which extension a wheel 29 is mounted for rotation. As indicated, it is preferable that each wheel 29 be provided with a pneumatic tire for an obvious purpose.

The above recited structure, that is, the structure relating to the stand 13 is duplicated upon each side of the motor cycle frame 1 and, as the arms 15 of the said stand extend in opposite directions, it is apparent that the wheels 29 are disposed in spaced relation to effect, when in engagement with the ground, a stand or stabilizer for the machine.

To brace the duplicate sections of the stand 13, suitable means such as is indicated at 30 may be provided, the said means being bolted or otherwise fastened to the cylinders 19 and the adjacent portions of the machine frame 1.

When it is desired that the wheel 29 be raised out of engagement with the ground, the operating lever 5 is forced forwardly, being first disengaged from the teeth 3 of the quadrant against action of spring 4. Forward movement of the lever 5 will exert an upward pull upon links 9 and 11 and stand 13, thereby elevating the wheels 29 above the ground. When used as a stabilizing device, the wheels 29 are adapted for engagement with the ground, the said wheels being cushioned or yieldably maintained in operative position through the medium of the spring pressed support 20, the springs 24 and 25 acting as a cushioning element. The links 9 and 11 tend to break any shock or jolt that might be otherwise conveyed to the operating lever 5.

From the above, taken in connection with the accompanying drawings, it is apparent that the raising and lowering of the entire stand is controlled by manipulation of the lever 5; that the spring 4 at all times exerts lateral pressure upon the lever 5 to force same into engagement with the teeth 3 of the quadrant; and that the wheels 29 when in lowered position serve not only as a stand, but also as a stabilizing device whereby a tilting or falling of the machine to one side is rendered impossible.

In reduction to practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claim.

Having thus fully described my invention, what I claim as new and desire to secure by Letters Patent, is:—

A stand for vehicles including a stabilizing device consisting of a cylindrical member affixed to the vehicle frame, a wheel, support means for the wheel, the said support means consisting of a forked element enlarged at its integral end, the said enlargement fitting the bore of the cylinder aforesaid, a collar arranged to embrace the cylinder and the integral end of the forked element, the collar serving as an abutment limiting movement of the forked element in one direction, a stem projecting into the cylinder from the enlargement, means loose upon the stem engageable with the inner cylinder wall to centralize the forked element relatively to the cylinder, spring means interposed between the enlargement and the means mounted on the stem, spring means interposed between the means mounted on the stem and the upper closed end of the cylinder, the said spring means acting as a cushion for the stabilizing device when moved into engagement with the ground, and means operable to actuate the device, as and for the purpose set forth.

In testimony whereof I affix my signature in presence of two witnesses.

ABRAHAM A. KLIGMAN.

Witnesses:
    JOSEPH KLIGMAN,
    MARY L. DONAHOE.